(12) United States Patent
Chien

(10) Patent No.: US 9,488,364 B2
(45) Date of Patent: Nov. 8, 2016

(54) USB CHARGER RELATED PRODUCTS HAS BUILT-IN FLUID AND DISPLAY UNIT

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 641 days.

(21) Appl. No.: 13/870,447

(22) Filed: Apr. 25, 2013

(65) Prior Publication Data

US 2014/0320064 A1    Oct. 30, 2014

(51) Int. Cl.

| | | |
|---|---|---|
| *H02J 7/00* | (2006.01) | |
| *F21V 33/00* | (2006.01) | |
| *F21S 10/00* | (2006.01) | |
| *A63H 3/00* | (2006.01) | |
| *A63H 23/08* | (2006.01) | |
| *B44C 5/00* | (2006.01) | |
| *G09F 23/02* | (2006.01) | |
| *G09F 23/04* | (2006.01) | |
| *G09F 23/06* | (2006.01) | |
| *A01K 63/00* | (2006.01) | |
| *A01K 63/06* | (2006.01) | |
| *F21S 8/00* | (2006.01) | |
| *F21W 121/00* | (2006.01) | |

(52) U.S. Cl.
CPC ............. *F21V 33/00* (2013.01); *A01K 63/006* (2013.01); *A01K 63/06* (2013.01); *A63H 3/003* (2013.01); *A63H 23/08* (2013.01); *B44C 5/00* (2013.01); *F21S 10/002* (2013.01); *G09F 23/02* (2013.01); *G09F 23/04* (2013.01); *G09F 23/06* (2013.01); *F21S 8/035* (2013.01); *F21W 2121/00* (2013.01)

(58) Field of Classification Search
USPC .................................. 320/107, 114
See application file for complete search history.

(56) References Cited

U.S. PATENT DOCUMENTS

| | | | | |
|---|---|---|---|---|
| 2002/0130638 A1* | 9/2002 | Sherman | ................... | G06F 1/26 320/134 |
| 2004/0108833 A1* | 6/2004 | Lanni | ................... | H02J 7/0004 320/116 |
| 2004/0113587 A1* | 6/2004 | Bohne | ................... | H02J 7/0004 320/128 |
| 2004/0257034 A1* | 12/2004 | Moayer | ............... | H01M 10/441 320/107 |
| 2006/0087281 A1* | 4/2006 | Tong | ..................... | H02J 7/0042 320/106 |
| 2008/0143294 A1* | 6/2008 | Phelps | ................. | H02J 7/0045 320/110 |
| 2014/0303557 A1* | 10/2014 | Lopez | .................... | A61M 5/44 604/114 |

* cited by examiner

*Primary Examiner* — Yalkew Fantu
(74) *Attorney, Agent, or Firm* — Bacon & Thomas, PLLC

(57) ABSTRACT

USB Charger related products have a built-in liquid display unit including decorative, reflective, and/or miniature items within a medium and an optional heater-means to cause movement of medium and the items included within the medium. The charger related products are supplied with power from an AC power wire, the 110 VAC to 250 VAC input power being converted into an output charging current having a range of 1.0 A to 12 A and 3.5 VDC to 8.5 VDC. In addition, USB digital signal or data ports may be connected with an external computer, consumer electric device, or communication device, and the USB charger related products may further include additional devices such as an AC outlets(s), sensor, motion sensor, remote control, timer, LEDs, power fail circuitry, audio, video, or smell devices, or other electric or electronic devices to provide one or more additional functions in addition to the charging function.

10 Claims, 8 Drawing Sheets

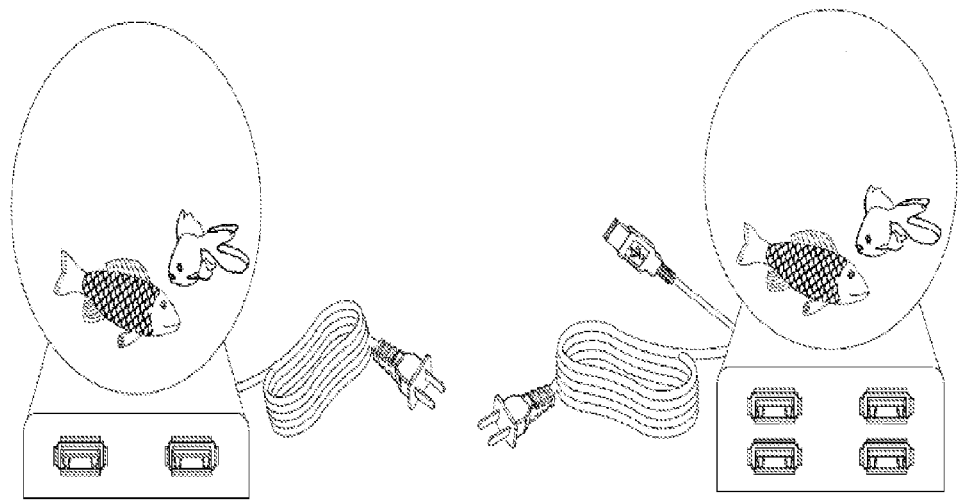
Fig. 1
Fig. 1a
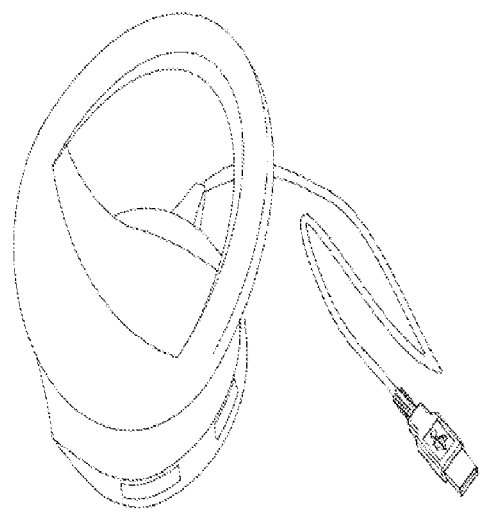
Fig. 2

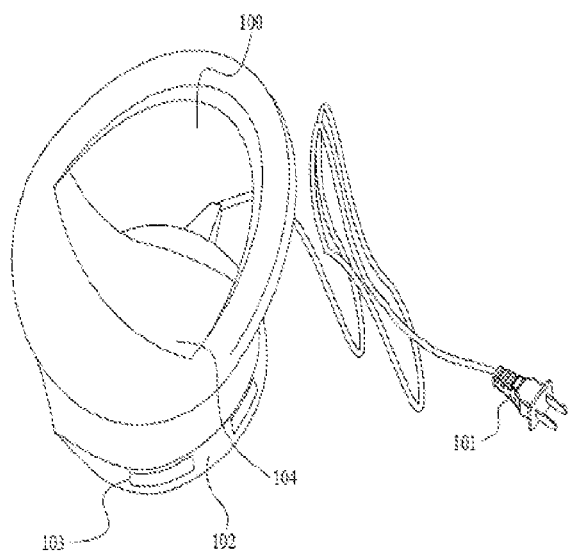
Fig.2a
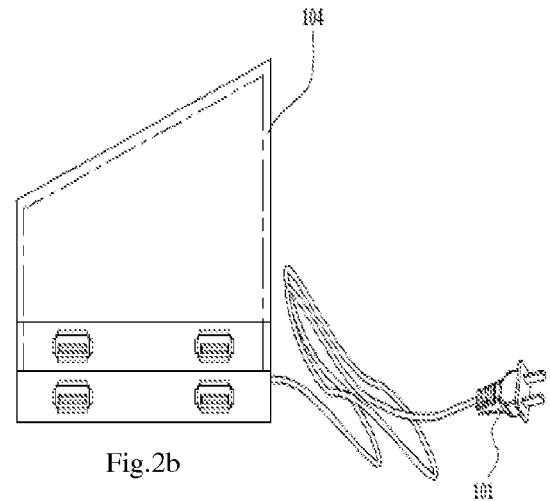
Fig.2b

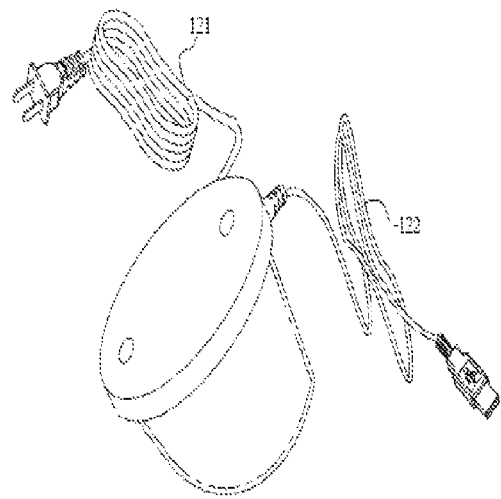
Fig.2c
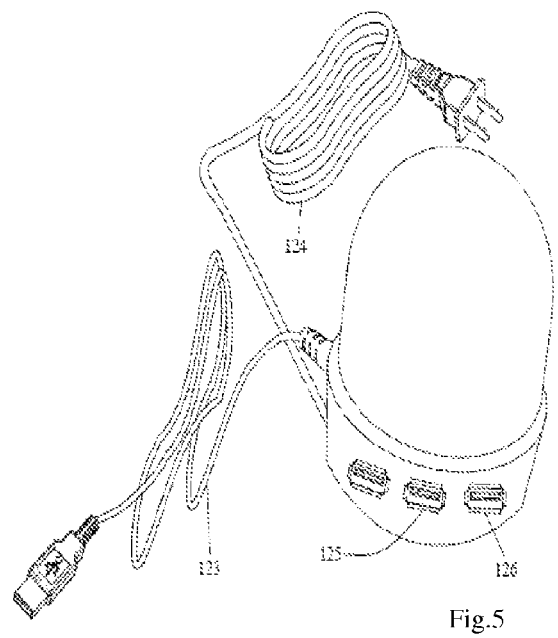
Fig.5
Fig.5a
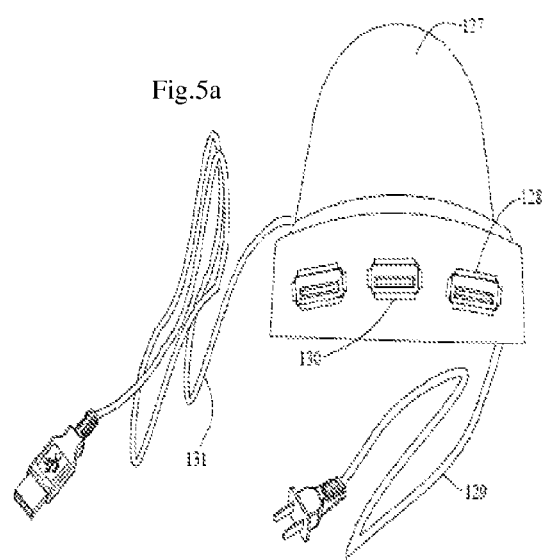

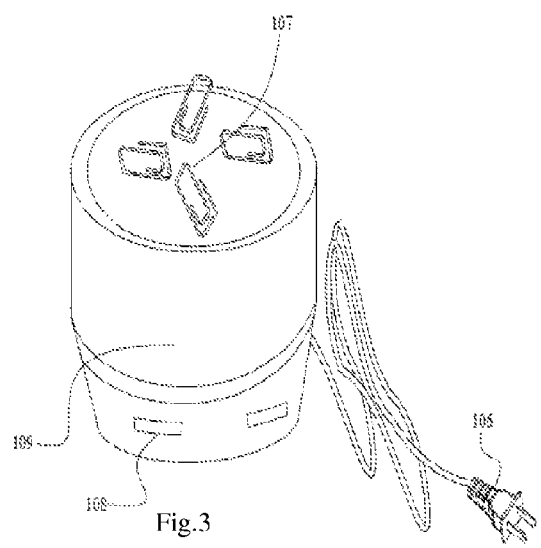
Fig.3
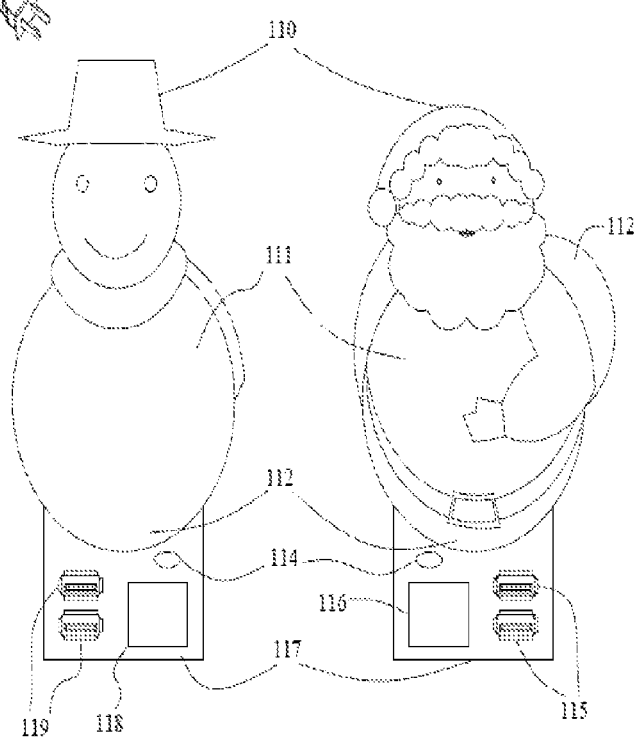
Fig.4

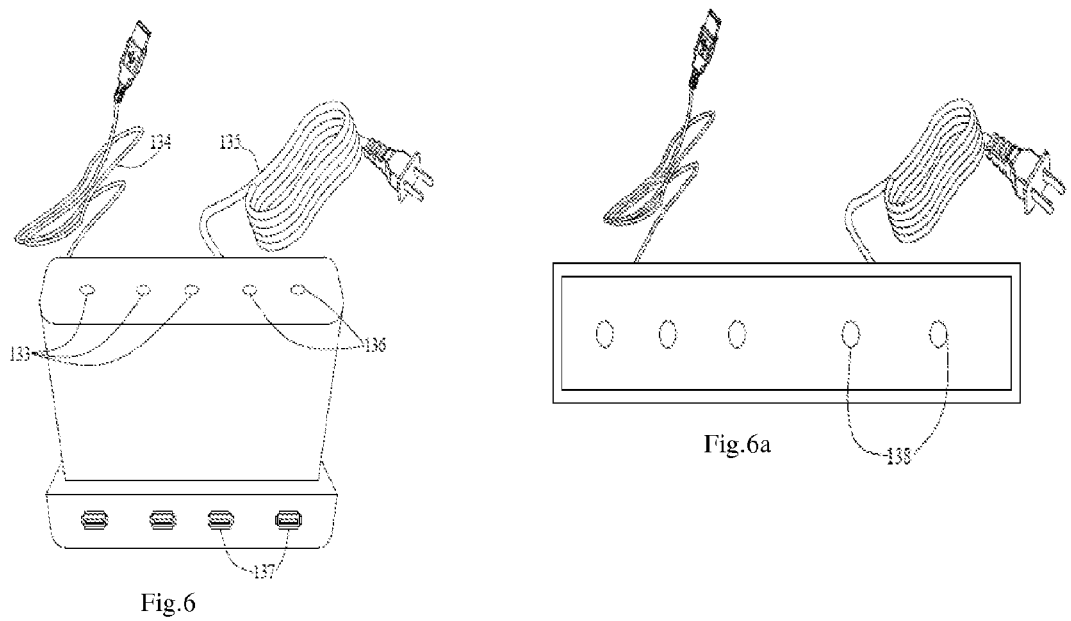
Fig.6
Fig.6a
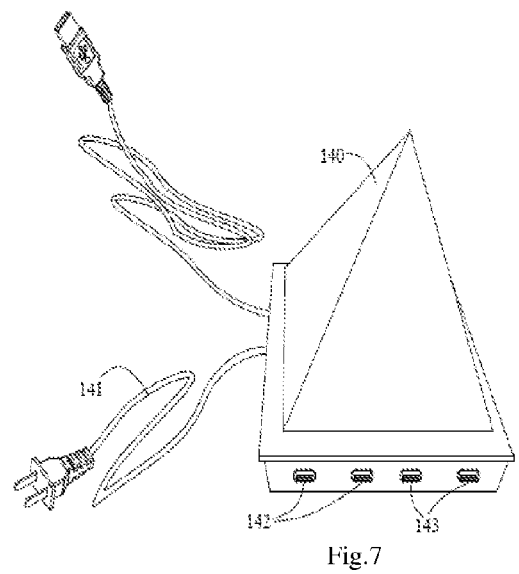
Fig.7

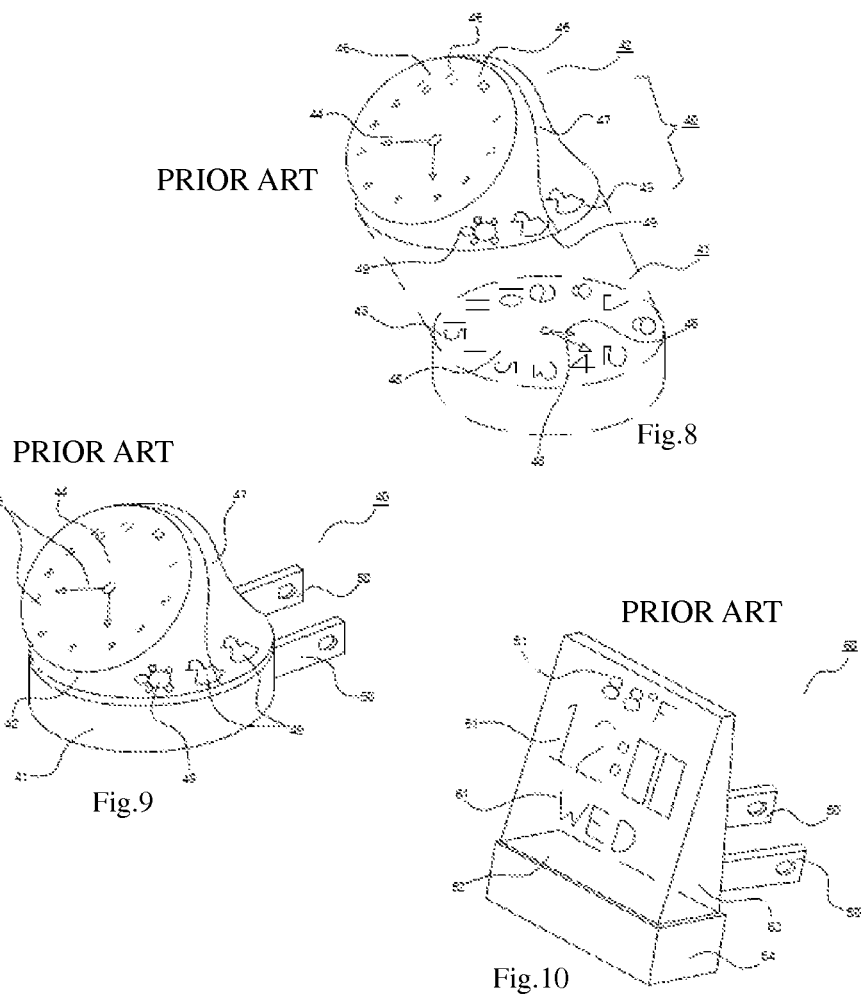
PRIOR ART
Fig.8
PRIOR ART
Fig.9
PRIOR ART
Fig.10

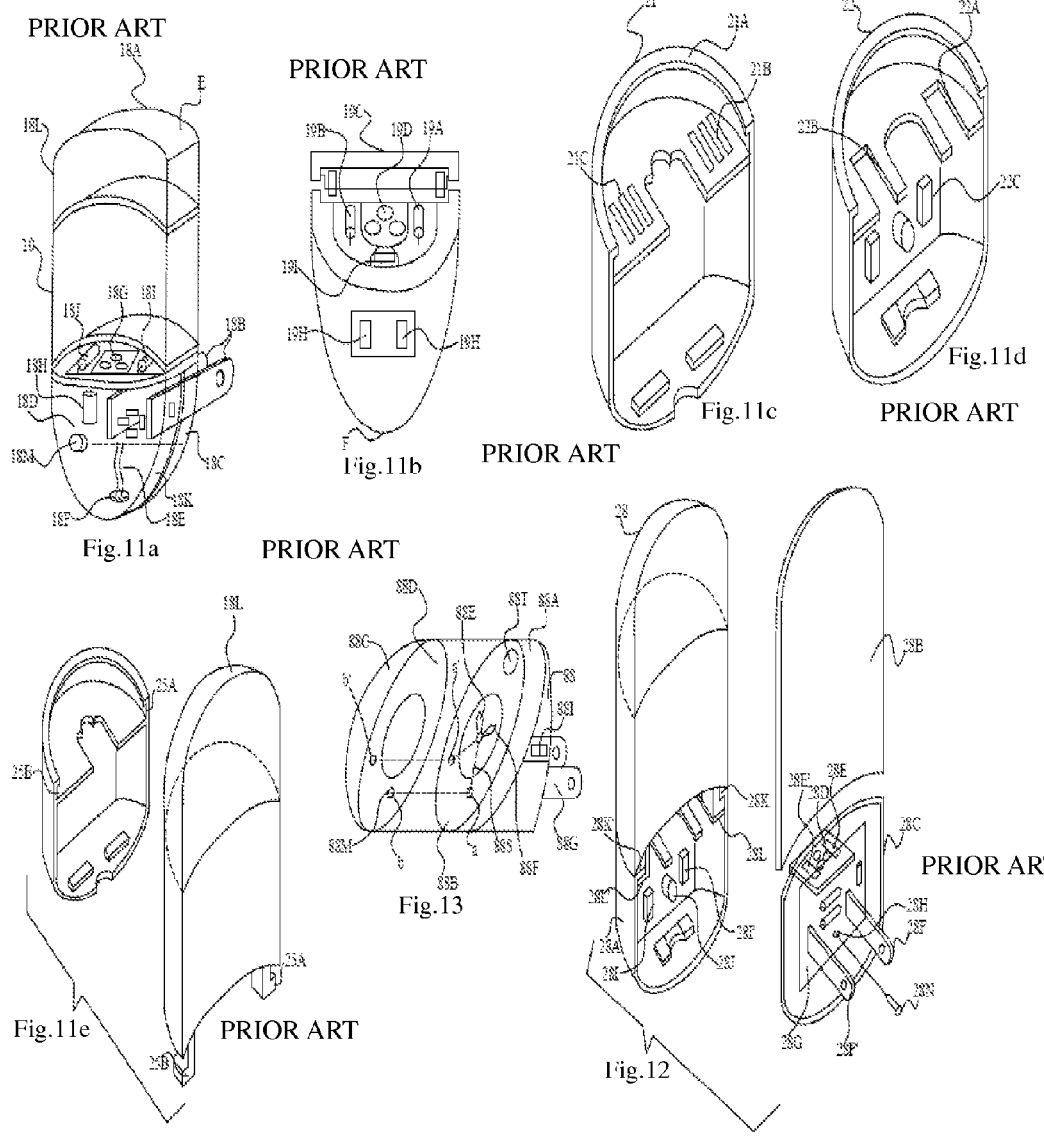

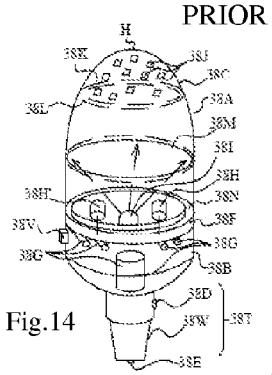
Fig.14 PRIOR ART
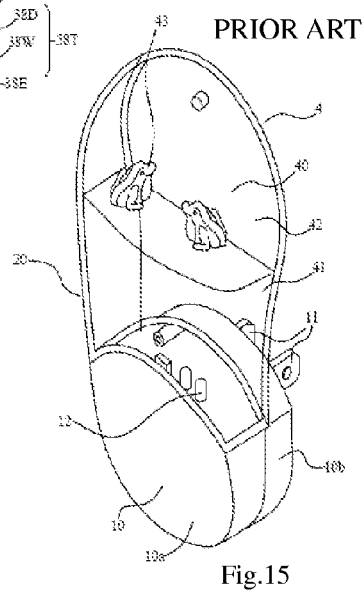
Fig.15 PRIOR ART
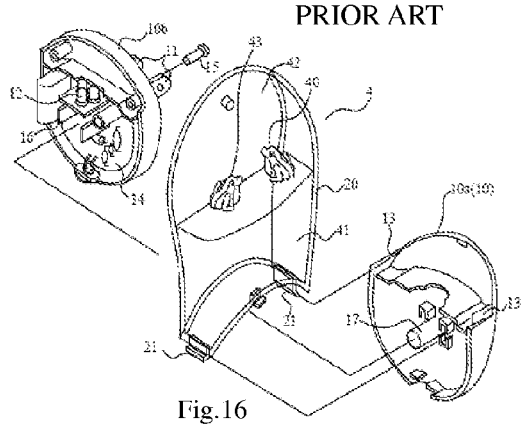
Fig.16 PRIOR ART

USB CHARGER RELATED PRODUCTS HAS BUILT-IN FLUID AND DISPLAY UNIT

BACKGROUND OF THE INVENTION

The current invention relates to USB charger-related products that may include a built-in liquid display unit of the type disclosed in the inventor's U.S. Pat. Nos. 5,926,440 and 7,909,477, the liquid display unit including a liquid medium, decorative-means and miniatures filled within the container for use with different light sources.

The current invention also has subject matter in common with the charger-related products disclosed in the inventor's U.S. patent application Ser. No. 13/870,253, filed Apr. 25, 2013 (wire arrangement for hand-reachable desktop USB charger-related products); Ser. No. 13/858,604, filed Apr. 8, 2013 (wire arrangement for USB charger device having an add-on or built-in wire arrangement-means); and Ser. No. 13/863,073, Apr. 15, 2013 (power station having built-in LED-units and USB charger for desktop installation).

The above-listed copending applications all disclose desktop hand-reachable USB-charger related products having wire-arrangements for receiving wires for supplying power to USB-ports, plug receiving sockets, LED-units or any combination thereof to offer people a hand-reachable charger or power supply that can be situated on a desk surface and that further includes a built-in wire arrangement for optimal convenience.

Main features of the charger-related products described in the copending applications include:
1. The products are hand-reachable so that there is no need to bend the human body or knee to make use of charging capabilities, thereby preventing people from incurring waist or knee injuries, which is especially useful for aged people.
2. A built-in wire arrangement enables coiling, wrapping, rolling, storage, and/or release of AC power wires or other wires required for USB charger operation as needed, eliminating messes caused by AC wires or other wires.
3. The desktop installation may incorporate attachment-means, fixing-means, assembly means, weight means, or magnetic means to keep the USB charger related products on a desk top or surface(s) without being moved by the weight of the AC power cord or an incoming force or dropping to the floor, etc.
4. The charger-related products can optionally have a flat and thin but large size to underlay all products which people will use on a desk top or surface thereby keeping the desk top nice and neat with no need to make extra space to accommodate the USB charger-related products.
5. The USB charger may have a minimum power output of 1.0 Amp or higher, which is not possible from laptop USB ports or other portable or travel USB chargers, thereby reducing the wait time for charging electric or electronic devices to save people having to wait for fully charged electric or digital data device(s).
6. The wire arrangement may include a roller, retractable means, spring means, or twist means, which allow people to keep all charging related wires well stored without creating a mess.

These six features offer people convenience for living.

The current invention also has subject matter in common with the inventor's U.S. patent application Ser. No. 12/950,017, filed Nov. 29, 2010 (multiple surface LED light with rotating devices having LED light device(s), and USB device(s) and/or outlet device(s) built-in to a rotating substrate with more than one surface to offer multiple functions) and Ser. No. 11/806,285, filed May 31, 2007 (multiple function LED light device); and U.S. Pat. No. 7,318,652 (multiple function wall cover; U.S. Pat. Nos. 7,651,365 and 7,810,985. Each of these patented or pending cases relates to a light source with an outlets device(s).

USB charger-related products are also described in the inventor's U.S. patent application Ser. No. 13/161,643, filed Jun. 16, 2011 (desk top item with LED means having USB-unit(s) or USB-module(s) to charge other electric or digital-data devices) and Ser. No. 13/117,227, filed May 27, 2011 (universal module has USB-unit(s) and/or outlet-unit(s) for a variety of electric or digital-data device).

The current invention differs from the light devices described in the following prior U.S. patents:

U.S. Pat. No. 7,736,033 (Bhart) discloses a lamp base with an electric device recharge receptacle, and in particular an outlet device and a cigarette lighter built on a lamp base. The lamp base includes circuitry that transforms an input AC current into a 12V DC automobile current, output, and further includes a plug-in device that transforms the input 12 VDC current into USB end current (5 Volt). This means that Bhart's device at least needs two expensive circuits/transformers to transform the input 120 VAC wall outlets power supply into a USB 5 VDC output. This is not economical and nobody needs a 12 VDC output for household use. In contrast, the present invention directly transforms an input-end 120 VAC into an output-end 5 VDC, which is more practical than the arrangement disclosed by Bhart.

U.S. Patent Publication No. 2011/017703 discloses a rotatable and concealable device which only has an outlet device with manual switch. The input 120 VAC power source is connected directly through a metal piece to deliver 120 VAC to the rotatable & concealable device's receptacles to offer 120 VAC current when another device is plugged into the receptacle. The '703 publication fails to disclose any USB charger concept, circuit, design and application, and so is not related to the current invention.

U.S. Pat. No. 7,897,277 (Meyer et al.) discloses a reversible battery cartridge which is used to provide backup power for all kinds of lamp and mainly for power fail application. This has nothing to do with USB ports and USB charger applications, and therefore is totally different from the current invention, which is related to a device having (1) USB ports+(2) USB charging+(3) an outlet supply power source+(4) an LED light and universal lamp base to fit for all kinds of existing lamp bases so as not to occupy any new desk top space because (5) the universal desk base overlays a top of the existing lamp base.

Furthermore, the current invention has (6) an LED light incorporated with the above-listed features (1) (2) (3) (4) and (5), so that it becomes a unique practical universal power station, especially because (7) the current invention can be arranged to not only supply one kind of power to a charger, but also can supply different types of power to different electric or digital-data device(s).

U.S. Pat. No. 6,474,823 discloses a laptop computer with a top illumination light. The computer uses a transformer to converting input AC power into 5 Volt DC current for internal use. However, there is no USB charger circuit inside the computer. Instead, the computer's external transformer directly delivers 5 VDC current to the USB port, so the computer system of this patent differs from the charger products of the current invention, which uses an internal USB charger circuit to convert 120 VAC into a 5 VDC USB charging output. As disclosed in this patent, the computer itself has an input-end current of 5 VDC and output-end current at the USB ports that is also 5 VDC so there is no need for a USB charger circuit inside.

Because of the above-described differences, the current invention has at least the following advantages:

A. It offers the most convenient way to use USB ports and/or other power outlets and LED units on a desk surface within a hand-reachable distance.

The current invention allows all power stations or products to be installed on the desk top very steadily and overcome the super heavy duty of the power cord, which extends from the wall outlet to the power station or products and exerts a pulling as a result of the cord's weight.

The normal design for all marketed extension cords with built-in outlets or additional features such as USB ports, audio-ports, video-ports, internet-ports, or other electric device's ports is not capable of being put on a desk top because the power-cord's weight is way too heavy if the outlet's power cords meet safety authorities' requirement that power cords use 10, 12, 14, or 16 gauge wire. Such a very heavy duty cord, which may have different lengths of from 1 foot to 100 feet is impossible to install on a desk top.

Furthermore, such a conventional outlet device does not really need to be put on a desk top because there are too few occasions to plug or unplug the plugs of electric or electronic devices into or from the outlet device.

However, the current invention has built-in USB ports or LED light device, for which there is a need to connect to the USB-ports or turn on-off the said LED unit(s) many times per day or at least once a day because of the many devices, such as cellphones, mobile phones, smartphones, iPads, and panel communication or consumer computer devices that need to be charged from USB ports. The current invention offers the most convenient way to put the USB-ports and LED units on the desk top so that people do not need to bend the body and knees to connect a device to a grounded multiple function extension cord or wall mounted USB ports for charging.

This is the major concept for the copending invention.

B. The current invention offers a simple way to install a power station or products on a desk surface so that people do not need to bend their body or knee to carry out a charging operation and thereby prevent injury or damage to the human waist and knee.

C. The power station can be adapted to include the unique features described in the inventor's copending U.S. patent filings in order to supply power to charge the majority of electric, digital-data, audio, video, or internet devices on a desk top without the need to frequently bend the body to or near the ground when connecting to a power source via an outlet or USB port, or making use of an LED unit.

The current invention may also be applied to the following:

(A) a rotating LED light device having outlets or electric receiving sockets as disclosed in copending U.S. patent application Ser. No. 12/950,017, filed Nov. 19, 2010;

(B) an electrical device having a built-in universal USB-unit(s) and outlet-unit(s), as disclosed in copending U.S. patent application Ser. No. 13/117,227, filed May 27, 2011;

(C) a desk top LED device having a USB-unit(s) or outlet-unit(s) to charge an electric or digital device, as disclosed in copending U.S. patent application Ser. No. 13/161,643, filed Jun. 16, 2011; and (D) a multiple function LED night light as disclosed in U.S. patent application Ser. No. 11/806,285, filed May 31, 2007.

The current invention may also use the following concepts described in the following LED-related filing cases of the inventor: (1) a project light, (2) more than one function, (3) adjustable focus, (4) adjustable angle, (5) elastic contact points, (6) an LED heat solution, (7) heat sensitive parts installation, and (8) extend means, which are disclosed in the inventor's U.S. patent application Ser. Nos. 13/367,758; 13/367,687; 13/296,508; 13/295,301; 13/021,107; 12/950,017; 12/938,564; 12/886,832; 12/876,507; 12/771,003; 13/021,124; 12/624,621; 12/622,000; 12/318,470; 12/914,584; 12/834,435; 12/292,153; 12/907,443; 12/232,505; 11/806,711; and 11/806,285.

The eight listed concepts are also disclosed in the inventor's U.S. patent application Ser. No. 13/295,301 ("The Device has build-in Digital Data means and Powered by unlimited power source of light device"); Ser. No. 13/296,508 ("The Device has build-in Digital Data means and power unlimited power source of LED Bulb"); Ser. No. 13/296,460 ("The device has build-in Digital data means and powered by unlimited power source of Lamp Holder"); Ser. No. 12/951,501 ("Lamp Holder has built-in LED Night light"); Ser. No. 12/950,017 ("Multiple surface LED light"); Ser. No. 13/162,824 ("Light device with display means has track-means and removable LED-unit(s)"); Ser. No. 12/938,628 ("LED light fixture has outlet(s) and removable LED unit(s)"); Ser. No. 12/887,700 ("Light fixture with self-power removable LED unit(s)"); Ser. No. 12/149,963, now U.S. Pat. No. 7,722,230); Ser. No. 12/073,095 (now U.S. Pat. No. 7,726,869); Ser. No. 12/073,889; Ser. No. 12/007,076 (now U.S. Pat. No. 7,726,841); Ser. No. 12/003,691 (now U.S. Pat. No. 7,726,839), and Ser. No. 12/894,865.

In addition to the above, light device related patent applications of the inventor include U.S. patent application Ser. Nos. 13/295,301; 13/296,469; 12/624,621; 12/622,100; 12/318,471; 12/318,470; 12/318,473; 12/292,153; 12/232,505; 12/232,035; 12/149,963; 12/149,964; 12/073,095; 12/073,889; 12/007,076; 12/003,691; 12/003,809; 11/806,711; 11/806,285; 11/806,284; 11/566,322; 11/527,628; 11/527,629; 11/498,874; 12/545,992; 12/806,711; 12/806,285; 12/806,284; 12/566,322; 12/527,628; 12/527,629; 12/527,631; 12/502,661; 11/498,881; 11/255,981; 11/184,771; 11/152,063; 11/094,215; 11/092,742; 11/092,741; 11/094,156; 11/094,155; 10/954,189; 10/902,123; 10/883,719; 10/883,747; 10/341,519; 12/545,992; 12/292,580; 12/710,918; 12/624,621; 12/622,000; 12/318,471; 12/318,470; 12/318,473; 12/292,153; 12/710,561; 12/710,918; 12/711,456; and 12/771,003.

The present invention may also utilize concepts described in the inventor's U.S. patent application Ser. No. 13/295,301 ("The Device has built-in digital data means and powered by unlimited power source for Lamp holder"); Ser. No. 13/296,469 ("Device has built-in digital data means and powered by unlimited power source for light Device"); Ser. No. 12/951,501 ("Lamp Holder has built-in LED light"); Ser. No. 12/771,003 ("LED light has geometric-unit(s) incorporated project means"); Ser. No. 12/711,456 ("LED power failure Light"); Ser. No. 12/710,561 ("LED light device has special effects"); Ser. No. 12/710,918 ("LED light device has more than 1 reflective means for plurality of image"); Ser. No. 12/624,621 ("projection device or assembly for variety of LED light"); Ser. No. 12/622,000 ("Interchangeable Universal Kits for all LED light"); Ser. No. 12/318,471 ("LED night light with pinhole imaging"); Ser. No. 12/318,470 ("LED night light with Projection features"); Ser. No. 12/318,473 ("LED night light with laser or hologram element"); Ser. No. 12/292,153 ("LED night light with Projection or imaging features"); Ser. No. 12/232,505 ("LED night light with Projection features"); Ser. No. 12/149,963 ("Removable LED light device") Ser. No. 12/149,964 ("Surface Mounted device with LED light"); Ser. No. 12/073,095 ("LED Track light device"); Ser. No. 12/073,889 ("LED light with changeable position with Preferable power source"); Ser. No. 12/007,076 ("LED light with changeable geometric system"); Ser. No. 12/003,691 ("LED light with changeable geometric dimension features"); Ser. No. 12/003,809 ("LED light with changeable features") Ser. No. 11/806,711 ("Multiple LED light with adjustable angle features"); Ser. No. 11/806,285 ("LED Night light with outlet device"); Ser. No. 11/806,284 ("LED Night light with more than 1 optics means"); Ser. No. 11/527,628 ("Multiple function Night light with air freshener"); Ser. No. 11/527,629 ("LED Night light with interchangeable display unit") Ser. No. 11/498,874 ("Area illumination Night light"); Ser. No. 11/527,631 ("LED Time piece night light"); Ser. No. 12/545,992 ("LED time piece Night light"); Ser. No. 12/292,580 ("LED Time Piece Night light"); Ser. No. 11/498,881 ("Poly Night light"); Ser. No. 11/255,981 ("Multiple light source Night Light"); Ser. No. 11/184,771 ("Light Device with EL elements"); Ser. No. 11/152,063 ("Outlet adaptor with EL"); Ser. No. 11/094,215 ("LED night light with liquid medium"); Ser. No. 11/094,215 ("LED Night light with Liquid optics medium"); Ser. No. 11/092,741 ("Night light with fiber optics"); Ser. No. 10/883,747 ("Fiber Optic light kits for footwear"); Ser. No. 11/498,874 ("Area Illumination for LED night light"); Ser. No. 11/527,629 "(Time Piece with LED night light"); Ser. No. 11/527,628 ("Multiple Function Night light with Air Freshener"); Ser. No. 11/806,284 ("LED Night light with more than one optics mediums"); Ser. No. 11/806,285 ("LED Night Light with multiple function"); and Ser. No. 11/806,711 ("Multiple LEDs Light with adjustable angle function").

The inclusion of any of the features disclosed in the above-listed U.S. patent applications of the inventor still fall within the scope of the current invention and all related equivalent functions or replacement parts also should fall within the current invention's scope.

The current invention relates to a wire arrangement for hand-reachable desktop USB charger related products. The term "USB charger related products" relates to products that at least have one USB charger with its receiving-means and any combination of additional market-available electric or electronic parts and accessories to form a single or plurality of function(s) device that can be placed on a desktop to offer people convenience without bending the body or knee to connected a device for charging.

BRIEF DESCRIPTION OF THE DRAWINGS

FIGS. 1, 1a, 2, 2a, 2b, 2c, 3, 4, 5, 5a, 6, 6a, and 7 are isometric views showing different applications of USB charger related products having built-in liquid and display units for respective paper weight, pen holder, magnetic device, key compartment, and stationary applications for a desktop, each with a built-in USB charger with AC power wires and/or USB digital data wires for connection to USB ports of an external computer, communication device, or consumer electric product.

FIGS. 8-10, 11a-11e, and 12-16 show prior art lighting devices to which the principles of the present invention may be applied.

DETAILED DESCRIPTION OF THE PREFERRED EMBODIMENTS

The current invention relates to USB charger related products having built-in liquid-containing display units, which may be similar to those described in the inventor's U.S. Pat. Nos. 5,926,440 and 7,909,477. U.S. Pat. No. 5,926,440 discloses a liquid-containing display unit with decorative or miniature-means and magnetic-means incorporated with an EL light and a time piece. U.S. Pat. No. 7,909,477 discloses a liquid-containing display unit with decorative or miniature-means and optional heater-means that cause the fluid to move or magnify effects of reflective pieces or characters included therein to provide eye-catching effects, performance, or functions.

As shown in FIG. 1, a first preferred embodiment includes a medium-means in the form of a liquid, fluid, oil, water, compound, gel, liquid-to-solid, or solid-to-liquid fills a geometric container to magnify an inner decorative-means, reflective-means, miniature-means, character-means, or any other means available from the market place and that be including the medium means to be seen by a viewer and to provide desired functions, performance, and effects.

FIG. 1a shows a variation of the first preferred embodiment with four rather than two USB ports. In general, the USB-charger related products of the current invention may be used for desktop applications that include stationary, desk light, and USB-signal devices in the form of or in any combination selected from a paperweight, weighted clip, pen-holder set, magnetic means for metal paper clips, multiple USB-ports for a USB-signal divider, key chain compartment, USB lighting device, and desk lighting, the charger related products including a built-in container filled with a medium-means, decorative means, display means, miniature means, liquid, gel, water, salt water, oil or any other solid-to-liquid or liquid-to-solid means.

The current invention may include both (1) a USB-charger with an AC power wire to connect with an AC Power source having a range of 110/250AC, and (2) a USB-signal divider (share) with a USB plug-wire to connect with a computer signal output-end to connect to a printer, removable memory means, external DVD, scanner, ATM reader, and card reader for a digital-data connector.

FIGS. 2 and 2a shows second and third preferred embodiment in which the USB charger related product is in the form of a cut cylinder shape with a space 100 (see FIG. 2a) to let people store something within such as a stapler-pin, metal paper clip, keys, nails, pins, hair clippers, and so forth, and which also has sufficient weight to become a paperweight as needed. The inner container 104 may be filled with a liquid containing decorative elements or miniatures. As shown in FIG. 2, USB signal-wires may be connected to the base 102 of the product. However, as shown in FIG. 2b, AC power-wire 101 may also be used to supply power to the USB ports 103.

The container of FIGS. 2 and 2a may be filled up with leaves, shells, miniature fish, and the like within the media-means to cause the miniature fish, leaves, shell, sand, etc. to appear larger than the actual size to enable people to enjoy an aquarium-tank on the desk top.

As shown in FIG. 2b, the USB charger related product may include four USB-ports situated below the container 104. The USB ports may have a charger function rather than USB digital-data connector or divider functions. In that case, all four USB ports may be output-ends for DC current having at least 1 Amp to charge other electric or digital-data device(s) when the other device's plug-means is inserted into any one of the four USB-ports.

FIG. 3 shows a magnetic desktop weight application with an AC power-wire to supply power to three USB charger ports arranged to output DC current to charge other electric or digital-data devices as in the above-described embodiments.

The desktop weight includes a central concave arrangement with magnetic so can make all metal relative piece such metal paper clipper, stapler's pin or other metal keys on position to easily to use.

The AC power-wire can also be stored under the charger unit as described in the above-cited patent applications of the inventor. Furthermore, the charger product can have an optional outlets device or air-freshener to provide the desk top products with function in addition to the USB charger function.

FIG. 4 shows seasonal desk top items having USB ports for receiving signal-data connectors, USB charger ports for charging other devices, and also built-in outlet-means to serve as an AC power source. The seasonal desk top items also have built-in liquid medium-means with miniatures, glitter, reflectors, leaves, floating items, characters, and cartoons with or without heater-means to cause salt-water or chemical compounds to flow and cause the glitter, inner miniatures, decorative items, or reflectors to move. It will also be appreciated that the heater-means may take the form of inner circuit means such as a transformer, inductor, resistor, capacitor, or other parts or accessories also can generate heat.

FIG. 2c shows wire arrangements for the current invention, including an AC power wire 121 that can be put on the bottom or just arranged to come out from a side wall to connect with an AC power source. The USB charger related product also has built-in liquid and display units and digital data wires 122 to enable data delivery as well as power delivery.

FIG. 5 shows another unit having USB ports 126 to deliver digital data via USB wires 123 from a computer device as well as USB charging ports 125 supplied with power via AC power cord 124. As a result of the data delivery ports 126, the limited number of computer USB output ports become a plurality of USB ports to enable digital data to be obtained from the computer system. The current invention thus provides a USB charger related product that not only has a built-in liquid display unit, but that also includes both USB charging ports 125 and USB ports 126 for data delivery.

FIGS. 2c, 5, and 5a all disclose more than one wire, one of which is an AC power wire to connect with an AC power source to provide power to a USB charger circuit that converts the AC power to a DC power current to charge other devices. The second of more than one wires is a digital-data wire that delivers the digital data from the computer so that the limited number of computer USB ports become a plurality of USB ports that can connect computer to external computer related devices such as a printer, scanner, external hard disc, game, speaker, camera, iPad, iPhone, download means, memory means, VCR, DVD, or other computer, communication, or consumer electric device.

FIGS. 6, 6a, and 7 show different shapes of USB charger related products having built-in liquid display units for different applications, such as a pen holder and paper weight, with more than one electric wire to connect with both a computer digital data source and an AC power source to provided multiple functions.

The preferred USB charger related products having a built-in fluid display-unit, as described above, may further include at least one LED light-means as well as related circuit means, IC means, switch means, and/or sensor means to offer illumination with predetermined timing, functions, brightness, colors, and duration.

As noted above, the medium-means included in the liquid display unit may be selected from a liquid, fluid, oil, chemical compounds, water, salt water, wax, gel, or some liquid-to-solid or solid-to-liquid material. In addition, at least one decorative-means may also be provided. The decorative-means may be selected from a reflective-means, diffusion-means, or optics-means to increase the value or appearance of the charger related product. Still further, at least one miniature means may be provided within the medium-means, the miniature being selected from one or more shell, leaves, dry flowers, potpourri, plastic piece, floating stuff, fish, animal, smiling face, metal piece, paper piece, wood piece, boat, snow flake, tree, and any material with a predetermined shape and colors, the material having a design, indicia, drawing, color, painting, or coating that enhances the value and appearance by causing the medium means to look like a conventional gift, seasonal, or everyday item with an optional scene or background inside.

Moreover, the preferred USB charger related product having a built-in fluid display means may include circuit means for providing an LED light with desired functions selected from the group consisting of steady on and off, pair flashing, scanning, color mixing, color changing, all flashing, and any combination of such functions.

The input AC current for the USB charger related products may have a range of from 110V to 250 Volt and an output DC current of at least 1 Amp. A converter is included to change the AC power source to DC power having a voltage of 3.5 Volt DC to 8.5 Volt DC at the USB charging port(s).

The above-described USB charger related products may include one or more additional devices such as a USB electric signal or digital-data divider or connector device (as opposed to current chargers), wire-arrangement construction means, outlet device, motion sensor device, time device, remote control device, infrared device, LED light device, LED aquarium light device, LED fluid light device, LED lava light device, LED Glitter light device, LED wax light device, LED light having a built-in fluid, liquid, wax, or gel container with or without inner heater-means, integrated circuit (IC), control device(s), smell device, air-circulation device, air-cleaner device, air-freshener device, liquid air-freshener device, wax air-freshener device, air-purification device sensor device, light device, sensor device(s), power fail device, color changing status indicator devices, controller device, motion device, audio device, video device, cable TV device, Internet device, or other electric or electronic device(s) to enable the charger related product to have one or more additional function.

The USB charger related products may also include at least one device selected from a motor, movement, filter device, IC chips with desired functions, sensor, rotating filter, magnetic piece and metal pieces, and sound receiver device to provide additional audiovisual effects and functions, as a switch means to enable selection of the multiple functions.

The USB charger preferably supplies a DC charging current of more than 1 Amp. The larger the charging current, the shorter the charging time period.

The USB charger related products may also include at least one AC power outlet for receiving a plug of another device to supply AC Power to the other device. However, those skilled in the art will appreciate that if the AC power outlets, LED-units, or other electric function device(s) are omitted, the size of the input AC power wire may be reduced while still meeting AC Power wire safety requirements. On the other hand, if additional AC outlets are included, the charger related product may optionally incorporate other power outlet related devices such as surge protection means, remote control means, a master power outlet (when the master outlet is turned on, all of the other outlets are simultaneously turned or turned on at a later time), sensor control means, current leakage warning means, and/or auto shut off means to increase the safety and convenience of the outlets. The above-described built-in USB-charger(s), AC power outlet(s), LED-unit(s) and other electric function device(s) may provide more than three functions, in which case the built-in AC power wire is arranged to meet the outlet's AC power wire safety standard.

The USB charger related products has a geometric shape with a space or magnetic-holder to store something within such as a stapler-pin, metal paper clip, keys, nails, pins, hair clips, and so forth, and also has sufficient weight to become a paperweight as needed.

The invention claimed is:

1. A USB charger device with a built-in fluid-containing display unit, comprising:
    an AC input wire for supplying an AC input current of between 110V and 250V AC,
    a USB charger including a USB-port for receiving and connecting with a plug-end of a USB wire to supply charging current for charging an internal energy storage device of an external electric or digital device, the USB charger outputting a DC output current of at least 1 Amp and between 3.5V and 8.5V DC;
    at least one additional function device selected from the group including at least one of a USB signal or data port, an AC outlet device, a motion sensor device, a time device, a remote control device an infrared device, and LED light device, an integrated circuit, a control device, a sensor device, a power fail device, a color changing status-indicating device, a smell device, a motion device, an audio device, a video device, a cable TV device, an Internet device, a wireless device, an electrical device, and an electronic device, said additional device providing at least one additional function; and
    a display unit containing a medium selected from the group consisting of a liquid, oil, chemical compounds, water, salt water, wax, gel, liquid-to-solid material, and solid-to-liquid material,
    wherein at least one decorative element is situated in said medium, said at least one decorative item being selected from the group consisting of a shell, leaves, dry flowers, potpourri, plastic piece, floating stuff, fish, animal, smiling face, metal piece, paper piece, wood piece, boat, snow flake, tree, and any material with a predetermined shape and colors, said material with a predetermined shape and colors having a design, indicia, drawing, color, painting, or coating that enhances a value and appearance by causing the USB charger device to look like a gift, seasonal, or everyday item with an optional scene or background inside, wherein said medium and decorative element are visible from outside the display unit.

2. The USB charger device as claimed in claim 1, further comprising at least one device selected from a motor, movement, filter device, IC chips with desired functions, sensor, rotating filter, magnetic piece and metal pieces, and sound receiver device to provide additional audiovisual effects and functions, and a switch to enable selection of the multiple functions.

3. The USB charger device as claimed in claim 1, wherein the USB charger device has a geometric shape with a space or magnetic-holder to store at least one item therein.

4. The USB charger device as claimed in claim 3, wherein said at least one item includes at least one of a stapler-pin, metal paper clip, keys, nails, pins, pens, pencils, and hair clip.

5. The USB charger device as claimed in claim 1, wherein the USB charger device has sufficient weight to become a paperweight as needed.

6. The USB charger device as claimed in claim 1, wherein the USB charger device has only USB-ports and at least one AC outlet, and wherein the USB charger device further includes outlet safety or convenience parts and accessories selected from a surge protection device, a remote control device, a master power controller, a sensor device, a current leakage warning device, and an auto shut off device.

7. The USB charger device as claimed in claim 1, wherein the USB charger device has only USB-ports, at least one AC outlet, and at least one LED-unit, and wherein the AC input wire has a gauge sufficient to meet safety requirements for a device having AC outlets.

8. The USB charger device as claimed in claim 1, wherein the charger device includes at least one LED and circuit means for providing the LED with desired functions selected from the group consisting of steady on and off, pair flashing, scanning, color mixing, color changing, all flashing, and any combination of such functions.

9. The USB charger device as claimed in claim 1, wherein the additional function device includes multiple USB signal or data output ports.

10. The USB charger device as claimed in claim 9, wherein the USB charger device includes a digital signal or data connection to an external computing or communications device, thereby providing the external computing or communications device having a limited number of USB ports with additional USB signal or data output ports, as well as at least one additional USB charging port.

* * * * *